(No Model.)
J. P. HASKITT.
HAND TRUCK.
No. 544,534. Patented Aug. 13, 1895.
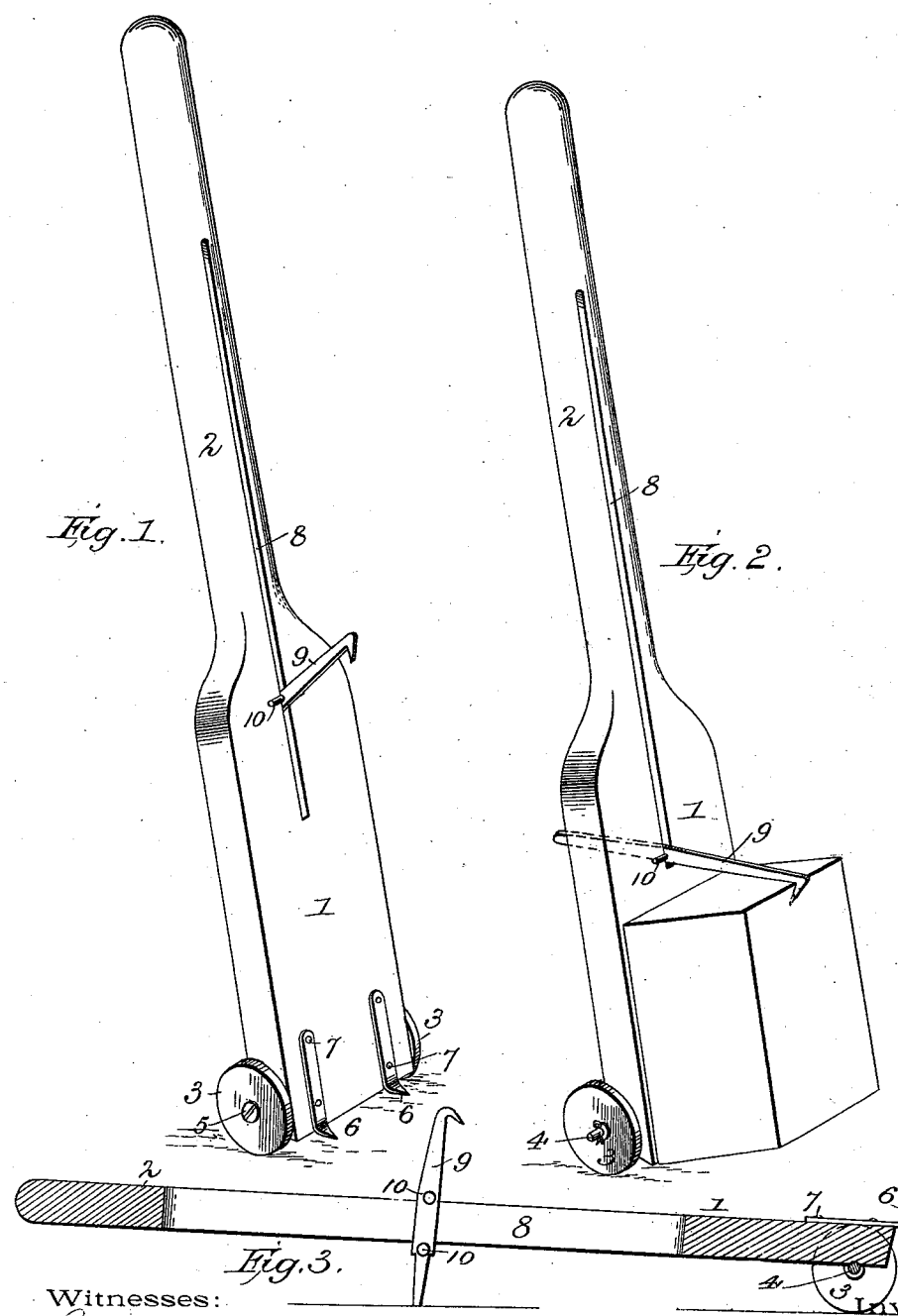

UNITED STATES PATENT OFFICE.

JOHN P. HASKITT, OF KINSTON, NORTH CAROLINA.

HAND-TRUCK.

SPECIFICATION forming part of Letters Patent No. 544,534, dated August 13, 1895.

Application filed January 24, 1895. Serial No. 536,090. (No model.)

*To all whom it may concern:*

Be it known that I, JOHN P. HASKITT, a citizen of the United States, and a resident of Kinston, in the county of Lenoir and State of North Carolina, have invented certain new and useful Improvements in Adjustable Hand-Trucks; and I do hereby declare that the following is a full, clear, and exact description of the invention, which will enable others skilled in the art to which it appertains to make and use the same, reference being had to the accompanying drawings, which form a part of this specification.

My invention relates to improvements in adjustable hand-trucks for conveying from place to place barrels, kegs, boxes, blocks of stone in marble yards, building material, and for moving, generally, articles and materials of every description to which the ordinary trucks are applicable.

The object of the invention is to provide an improved construction of the same, whereby I secure important advantages with respect to simplicity and economy in manufacture and efficiency in use.

The invention consists in the novel construction and combination of parts hereinafter fully described and claimed.

In the accompanying drawings, Figure 1 is a perspective view of a truck constructed in accordance with my invention. Fig. 2 is a similar view showing a box upon the truck and the pointed hook engaging therewith to hold it in place. Fig. 3 is a longitudinal sectional view of the truck.

In the said drawings the reference-numeral 1 designates a platform made of wood or other suitable material, formed or provided with a handle 2. At its lower end the platform is provided at each side with a small wheel 3. For heavy trucks these rollers are mounted and turn upon an axle 4, secured to the under side of the truck or platform, (see Fig. 2,) while for light trucks the wheels are journaled on lag-screws 5, secured to the sides of the platform. (See Fig. 1.) Secured to the lower end of the platform are right-angle hooks 6, which serve to hold the article to be moved and prevent it from sliding off the platform. The hooks are secured to the platform by means of bolts 7.

The handle 2 and platform 1 are formed with a long slot 8, in which works or is slidable a lever 9, formed at its upper end into a pointed hook, and provided intermediate its ends with two pins 10 10, projecting through apertures therein, and one engaging with the upper side and the other with the lower side of said handle and platform.

The operation is as follows: The handle 2 is elevated and the lower end of the truck inserted underneath or against the article or object to be moved. The hooked lever is then slid down in the slot, and when it nearly reaches the said object its hooked end is tilted so as to engage therewith, and the pins 10, binding against the upper and lower sides of the platform, securely hold and retain the object or article on the truck, whereby it may be transported to any place desired without liability of falling off.

Having thus described my invention, what I claim is—

In an adjustable hand truck, the combination with the platform and handle formed with a long slot, of the hooked lever located in said slot, the lateral pins passing through said lever on opposite sides of the slot and engaging respectively, with the upper and lower sides of the handle and platform, the wheels, and the hooks at the lower end of the platform, substantially as described.

In testimony that I claim the foregoing as my own I have hereunto affixed my signature in presence of two witnesses.

JOHN P. HASKITT.

Witnesses:
E. S. PITTMAN,
A. J. PHILLIPS.